May 11, 1954
A. J. FINK
2,677,911
FLYING GAFF
Filed Aug. 13, 1949
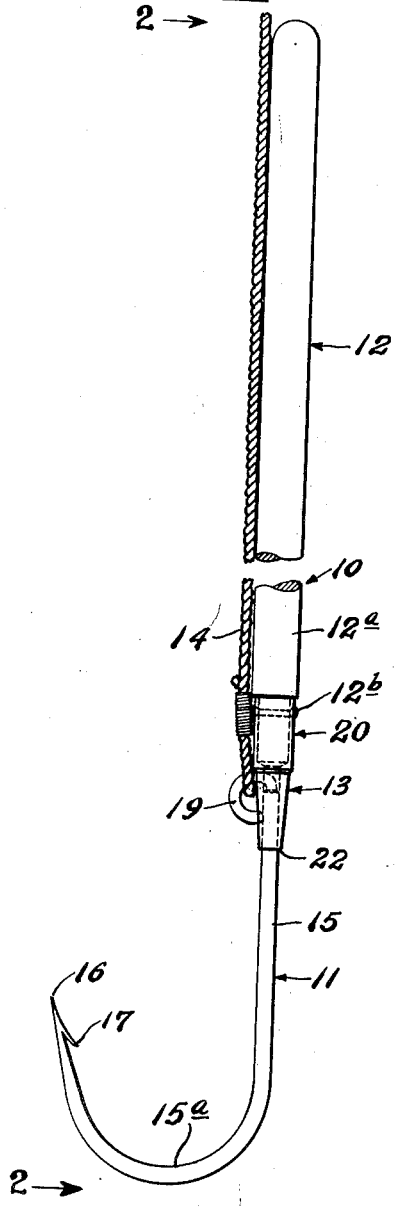
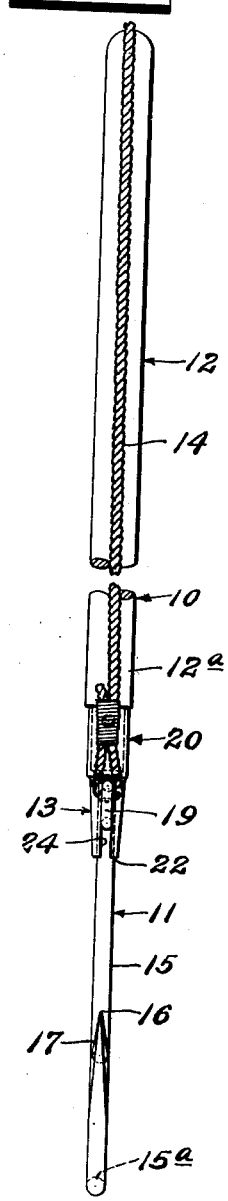
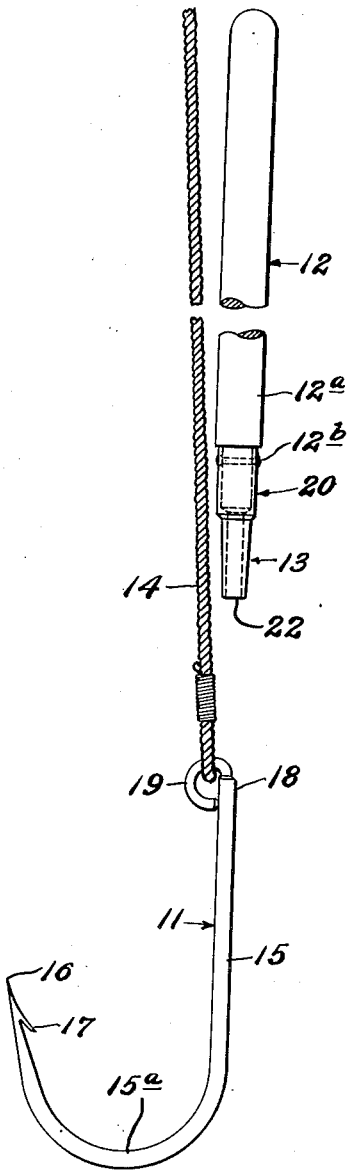
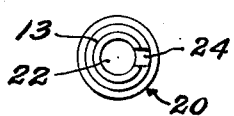
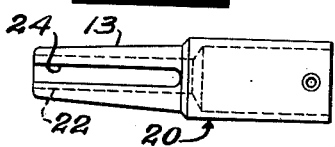
INVENTOR.
AUGUST J. FINK
BY
Joseph F. O'Brien
ATTORNEY Patented May 11, 1954

2,677,911

UNITED STATES PATENT OFFICE 2,677,911

FLYING GAFF

August J. Fink, Freeport, N. Y.

Application August 13, 1949, Serial No. 110,166

1 Claim. (Cl. 43—5)

This invention relates to improvements in flying gaffs.

One of the objects of this inventoin is to provide a flying gaff comprising an elongated handle member and a relatively short hook member having an initial connective engagement between a ferrule of the handle member and a shank portion of the hook member extending axially in relation thereto that will, in combination with a flexible or rope connection between the parts, permit manipulation in the operation of gaffing a fish but will be automatically releasable without any manual releasing operation by a separating pull exerted axially by the fish or by the fisherman upon the hook portion of the hook member being engaged.

Another object of my invention is in a device of the character specified to provide a hook member comprising a rectilinear shank portion extending in alignment with the ferrule of the handle member and a hook portion curved radially to one side only of said rectilinear shank to produce a small frictional tension between the hook and handle members that will be releasable by a direct axial pull but will, in combination with the flexible rope connection between the parts, enable facile and efficient manipulation in a gaffing operation, while being automatically releasable by a direct separating pull when the hook member is engaged.

Still another object of my invention is to utilize materials for the connectively-engaged parts of my flying gaff that will avoid corrosion and a freezing of the the said parts.

Another object of my invention is in a flying gaff of the type specified to utilize an elongated closely fitting socket of smooth bore and shank of smooth periphery and employing an integral shank portion of the hook member and using a handle member having a metallic ferrule provided with an axially-positioned elongated and closely-fitting socket.

Still another object of my invention is in a device of the character specified to utilize in a ferrule on the handle member a smooth-walled axially-positioned shank-receiving socket and to provide said socketed portion with a smooth-walled integral longitudinal slot communicating with said socket but of smaller width than the cross-sectional area or diameter thereof and extending radially of the axis of said socket, and to combine therewith a cooperating and closely-fitting radially-extending ring or eye on the engaging or connecting portion of the shank of the hook member to permit fastening to the hook member of a flexible connection or rope and to slide in said longitudinally-disposed slot while the shank is sliding in the axial socket, said eye and slot thus serving as a connecting terminal for the rope but as a guide during movement into engagement of the parts having said socket and pin member and functioning as a stop against both axial movement and rotation of the shank of the hook in the socket.

Still another object of my invention is to dispose a ring of the type specified in substantial alignment and parallelism with the curved portion of the hook whereby the line attached to said ring or eye will in use be on the same side of the handle as said curved portion of the hook member and in a position forwardly of the direction of the movement of the hook during a gaffing operation of the fish in which position said flexible connection or rope may be releasably held by the tips of the fingers of the user while surrounding the handle so as to cause an immediate release thereof upon a pull caused by the fish being impaled on the hook member.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in side elevation of a flying gaff embodying my invention and showing the handle and hook members in connectively-engaged relationship;

Fig. 2 is a front elevation showing members shown in Fig. 1 on the line 2—2 thereof and also illustrating the same in connectively engaged relationship;

Fig. 3 is a view in side elevation of the connectively engaged parts in automatically released position;

Fig. 4 is a view in elevation of the receiving end of the ferrule of the handle member; and Fig. 5 is a view in front elevation of the ferrule shown in Figs. 1 to 3 and removed from the handle member.

Referring now to these drawings, which illustrate a preferred embodiment of my invention, 10 indicates a flying gaff comprising a hook member 11 and a handle member 12 which are connected together by an automatically releasable, closely-fitting and smooth slidably-connective engagement at 13 that causes the parts to be initially held in assembled condition solely by the frictional peripheral contact of the closely-engaged parts of the hook and handle members, respectively, these parts being so arranged as to be automatically releasable by outward separating pull exerted axially on the shank of the hook member, and the parts are also preferably held against such automatic release and separation by a flexible connection or rope 14 having one end thereof connected with said hook member at said releasable connection and adapted to be held intermediate its ends solely by the fingers of the user in position for complete and ready release from the handle, and having its opposite end securely and independently fastened to a winch or other relatively fixed element.

The hook member 11 of my flying gaff 10 is preferably composed of a cylindrical rod of stainless steel and comprises a rectilinear shank portion 15 having adjacent to one end an arcuate lateral bend extending radially of the rectilinear shank portion to produce a laterally bent hook 15a provided at its terminal end with a bill 16 and preferably having a tine 17. The opposite end of said shank portion 15 is provided with a handle connecting section 18 which is preferably continuous and in alignment with said shank portion and has connected thereto a radially disposed ring or eye 19 of reduced diametric dimension, and preferably extending in substantially the plane of the bend of the hook 15a, said eye 19 preferably comprising an integral radially bent end portion of the shank at said handle connecting end that is preferably bent laterally and reentrantly in the plane of said hook to provide a ring-shaped lateral extension on the hook member which will enable connection thereto of the flexible connection or rope 14. Said eye 19 preferably provides on the connecting end of the shank a guide and stop member for cooperation with parts of a metallic ferrule 20 on the connecting end of the operating handle 12.

The handle member 12 may be made of any suitable material and is preferably provided with the metallic ferrule 20 composed of bronze and having an axial socket 22 at its upper end for the insertion of a handle portion 12a of wood or like material which is preferably fixed thereto as shown by a rivet 12b.

The opposite end of the ferrule 20 is provided with an axial bore or socket 22 adapted to closely fit the connecting end of the shank 15 so as to provide said closely-fitting, automatically releasable and slidably-connective engagement. Communicating with said axial bore 22 in a plane that is preferably in alignment with the hook portion 15a of the hook member 11 is a longitudinally extending and radially disposed kerf or slot 24 adapted to receive the said radially extending ring or eye 19 of the said shank 15. The said axial socket 22 and communicating slot 24 are preferably of sufficient length to provide a firm though slidable connection between the ferrule 20 and the shank portion 15 and said ferrule 20, its socket and slot are considerably longer than the diameter of the ring or eye 19 so as to provide a firm and closely fitting though slidable connection between said ferrule 20 and the shank 15 of the hook member 11. When the handle and hook members are arranged in the position shown in Figs. 1 and 2 the end of the rope member 14 is fastened to guide ring 19 and extends loosely along the handle portion 12a. Because of the position of the ring 19, the rope 14 will extend in a plane in substantial lateral alignment with the hook portion 15a of the hook member 11. Consequently, when in the operation of gaffing a fish the handle is held by the fingers of the user, the position of the rope will not only be in the plane of the hook but will be in such position as to be retained on the handle by the fingers of the fisherman so that when in such operation of gaffing a fish, the hook is inserted into the fish the rope will be readily releasable by the user, and when an outward axial pull is exerted on the hook or a relative inward axial pull is exerted on the handle, the slidable connective engagement between the ferrule and the hook member will be immediately released and the hook member connected, as aforesaid, to a fixed element through the flexible connection will remain in the fish and the handle member will remain in the hands of the fisherman.

It will be understood that during use of a gaffing device in gaffing a fish, a fisherman does not have time to operate any releasing mechanism that requires a manual release, and in the instant invention such release is completely automatic so that the mere insertion of the hook in the gaffing operation into a fish is sufficient to cause the release of the hook member from the handle or pole member and to permit the hook member to remain in the fish while the pole will remain in the hands of the fisherman to be disposed of as he sees fit.

The operation of the device will be clear from the above description, it being only necessary to say that immediately upon the insertion of the hook member into a fish the flexible connection or rope will be pulled through and out of the fingers of the fisherman, and the hook will be simultaneously and automatically released from the ferrule of the handle, but during the operation and the swinging of the hook and the movement of the handle, the hook member has no tendency to be released from the handle because, due to the position of the hook, such movement will provide a tilting tension and consequent friction on the connective engagement of the parts which will assist in retaining such parts in engaged condition until an actual separating pressure is produced either by the outward movement by the fish or the inward movement of the handle by the fisherman in relation to an inserted hook.

Having described my invention, I claim:

A flying gaff comprising a handle member having a smooth-surfaced cylindrical axially-disposed socket of similar diameter throughout its length and provided with a wall having an elongated radially-disposed slot extending in a given plane and communicating with said socket substantially throughout the length thereof, a hook member comprising a shank arm having at its upper end a relatively short radially-disposed projecting element slidably movable through said slot to the bottom thereof, said shank being provided with a cylindrical axially disposed smooth-surfaced connecting portion closely fitting and having a slidably connective engagement with said socket that causes said smooth surfaced connecting portion in assembled condition to have a close peripheral contact with said axially-disposed socket, said shank also being provided with a rectilinear extension section extending in assembled condition in axial alignment with said socket, and an overhanging gaffing-arm portion formed in the shape of a wide hook extending from the outer end of said rectilinear extension section in a radial plane, and provided at its outer end with a bill and a tine, said shank and gaffing arm being so arranged that the weight of said overhanging gaffing arm portion will initially produce sufficient tension to retain said socket and connecting hook portion in interengagement during manual manipulation of the gaff, and pressure on the bill by a fish in the operation of gaffing will produce such additional frictional tension between the axially-disposed connecting portion and the wall of the axially-disposed socket as to firmly hold said parts in connected position, said firm hold of said connected parts being automatically releasable when a hooked fish moves into substantial alignment with the axis of said axially-disposed socket, and an independent flexible connection fastened at its outer end to said radially-disposed projecting element on said hook member and connected at its opposite end to a fixed point.

References Cited in the file of this patent

UNITED STATES PATENTS

| Number | Name | Date |
|---|---|---|
| 206,694 | Taylor | Aug. 6, 1878 |
| 923,573 | Perry | June 1, 1909 |
| 1,168,126 | Symes | Jan. 11, 1916 |
| 1,171,432 | Henderson | Feb. 15, 1916 |
| 1,752,865 | Thorpe et al. | Apr. 1, 1930 |
| 2,194,618 | Schrambin | Mar. 26, 1940 |
| 2,236,427 | Garrison | Mar. 25, 1941 |
| 2,541,759 | Hambre | Feb. 13, 1951 |

FOREIGN PATENTS

| Number | Country | Date |
|---|---|---|
| 25,334 | Great Britain | Dec. 6, 1905 |